United States Patent
Chang et al.

(10) Patent No.: US 6,802,246 B1
(45) Date of Patent: Oct. 12, 2004

(54) TIMER TEA MAKER

(76) Inventors: Richard Chang, 4th Fl., No. 276, Sec. 1, Ta Tung Rd., Hsi Chih Town, Taipei Hsien (TW); Mario Bernardo Accumanno, 44 Cutter Dr., East Hanover, NJ (US) 07936; Michael William Crowley, 4 Meadowbrook Rd., Randolph, NJ (US) 07869

( * ) Notice: Subject to any disclaimer, the term of this patent is extended or adjusted under 35 U.S.C. 154(b) by 0 days.

(21) Appl. No.: 10/832,371

(22) Filed: Apr. 27, 2004

(30) Foreign Application Priority Data

Jun. 25, 2003 (CN) .......................... 03147827 A

(51) Int. Cl.[7] .......................... A47J 31/02; A47J 31/10; A47J 31/14; A47J 31/24; A23L 1/00
(52) U.S. Cl. .......................... 99/285; 99/299; 99/306; 99/323
(58) Field of Search .......................... 99/495, 516, 536, 99/452–455, 275, 279, 285, 295–299, 304–306, 323, 323.1, 323.3, 316, 317; 210/474–479, 181; 426/432, 433, 439

(56) References Cited

U.S. PATENT DOCUMENTS

| | | | | |
|---|---|---|---|---|
| 2,021,293 A | * | 11/1935 | De Silva | 99/299 |
| 4,785,723 A | * | 11/1988 | Sheen | 99/279 |
| 5,632,193 A | * | 5/1997 | Shen | 99/285 |
| 5,725,765 A | * | 3/1998 | Shen | 210/238 |
| 5,826,493 A | * | 10/1998 | Tien Lin | 99/306 |
| 5,855,160 A | * | 1/1999 | Shen | 99/279 |
| 5,862,739 A | * | 1/1999 | Lin | 99/285 |
| 5,943,946 A | * | 8/1999 | Chen | 99/297 |
| 6,058,827 A | * | 5/2000 | Lin Tien | 99/299 |
| 6,164,190 A | * | 12/2000 | Tien Lin | 99/299 |
| 6,327,965 B1 | * | 12/2001 | Lin Tien | 99/299 |
| 6,343,542 B1 | * | 2/2002 | Shen | 99/299 |
| 6,742,442 B1 | * | 6/2004 | Su | 99/281 |

* cited by examiner

Primary Examiner—Timothy F. Simone
(74) Attorney, Agent, or Firm—Bacon & Thomas PLLC

(57) ABSTRACT

A timer tea maker is constructed to include an infusion cup carrying a timer, and a link mechanism provided at one side face of the infusion cup and controlled by the timer to raise a stopper from a bottom through hole of the infusion cup for enabling prepared tea to discharge out of the through hole to a tea cup below the infusion cup when the set time has expired.

12 Claims, 8 Drawing Sheets

TIMER TEA MAKER

BACKGROUND OF THE INVENTION

1. Field of the Invention

The present invention relates to a tea maker and, more particularly, to a timer tea maker, which automatically controls the infusion time.

2. Description of Related Art

A variety of tea makers are commercially available and widely used by consumers so that they may enjoy a refreshing drink without having to spend a lot of time in preparation. In particular, ease of use is an important factor to consumers when choosing a tea maker.

A conventional tea maker comprises an infusion cup having a bottom through hole, and a stopper movably mounted in the bottom through hole of the infusion cup and controlled to close/open the bottom through hole. The stopper may be variously embodied. For example, the stopper can be a steel ball, plate member, or conical member. The tea maker further comprises a link mechanism mounted at one side of the infusion cup for operation by the user to move the stopper in the bottom through hole of the infusion cup, i.e., to move the stopper between the closed position where the bottom through hole is closed, and the open position where the bottom through hole is opened for enabling prepared tea to flow out of the infusion cup The aforesaid tea maker must be manually controlled by the user to close/open the bottom through hole of the infusion cup. If the user is busy and simultaneously working while also infusing tea-leaves in the infusion cup, the user may forget to discharge the prepared tea out of the infusion cup, resulting in a stewing of the tea leaves. If tea-leaves are over-infused in boiling water, the concentration of the prepared tea becomes excessive, resulting in a bitter taste. Further, if the prepared tea is kept in the infusion cup for too long, the temperature of prepared tea will drop and be unappetizing.

SUMMARY OF THE INVENTION

The present invention has been accomplished under the circumstances in view. It is therefore the main object of the present invention to provide a timer tea maker, which uses a timer unit to automatically control the opening of the stopper, for enabling prepared tea to flow out of the infusion cup subject to the pre-set infusion time.

It is another object of the present invention to provide a timer tea maker, which allows the user to open the stopper either automatically or manually as desired, for enabling prepared tea to flow out of the infusion cup when ready.

To achieve these and other objects of the present invention, the timer tea maker comprises an infusion cup, and a timer unit. The infusion cup comprises a through hole in a bottom wall thereof, a link mechanism mounted at one side face thereof, and a stopper axially movably mounted in the through hole and driven by the link mechanism to close/open the through hole. The link mechanism has a bottom side coupled to the stopper and a top side extended to a top side of the infusion cup. The timer unit is mounted on the infusion cup for pre-setting the infusion duration and driving the link mechanism subject to the pre-set time. The timer unit comprises an actuating member coupled to the top side of the link mechanism.

When the preset infusion time has expired, the actuating member of the timer unit drives the link mechanism to the stopper from the through hole of the infusion cup, for enabling prepared tea to flow out of the infusion cup. If the user wants to prematurely end the set time when the timer unit is still counting, the user may manually reverse the timer unit to end the set time. Further, without using the timer unit, the user can directly and manually press the link mechanism to raise the stopper from the through hole of the infusion cup.

Further, a cup holder may be formed at the bottom side of the infusion cup. The cup holder comprises a base and an upright support. The base is adapted to place a cup for receiving prepared tea from the infusion cup, and the upright support upwardly extended from the base and connected to the periphery of the infusion cup holds the infusion cup above the base at a distance.

A filter may be mounted in the infusion cup to remove solid matters from prepared tea. When a different type of filter paper is installed in the infusion cup, the infusion tea maker can serve as a coffee maker.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
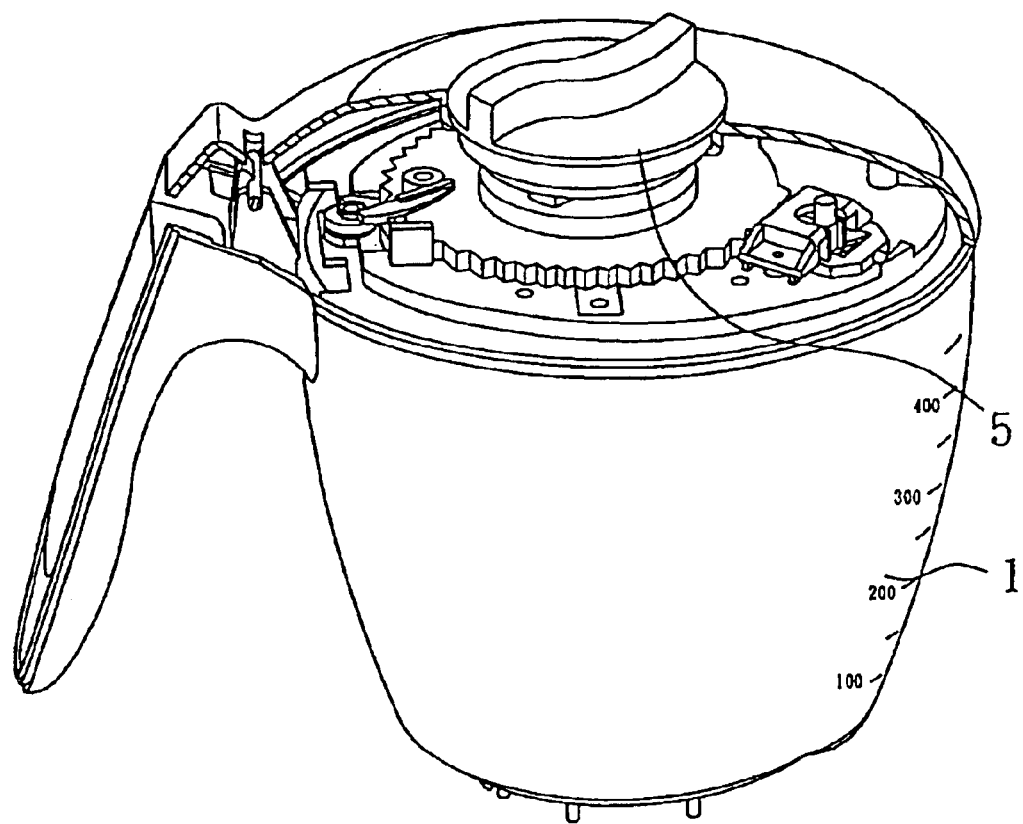
FIG. 1 is a perspective view of a timer tea maker according to the first embodiment of the present invention.

Referring to FIG. 1, a timer tea maker in accordance with the first embodiment of the present invention is shown comprised of an infusion cup 1 and a timer unit 5.

Figure 2:
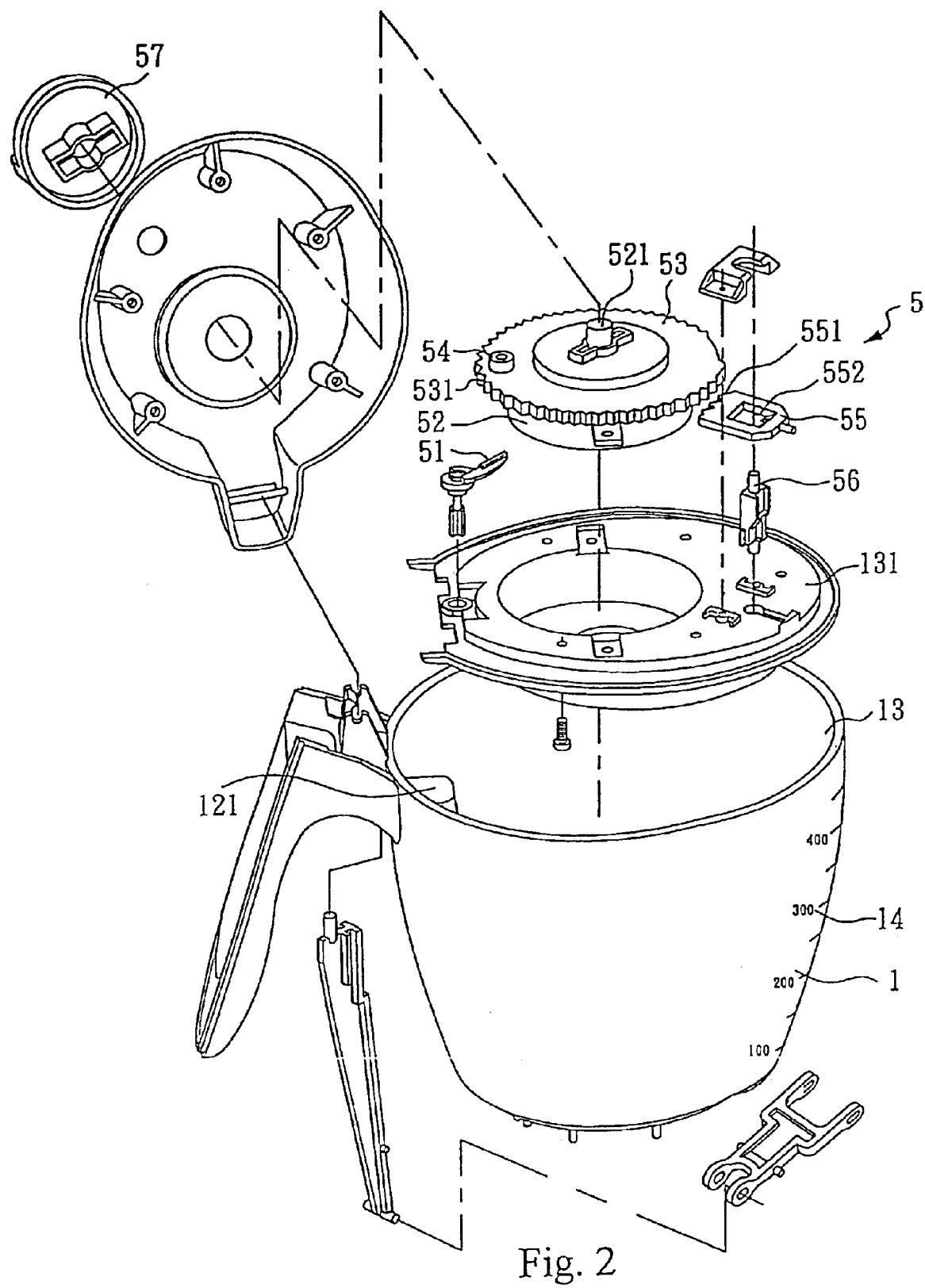
FIG. 2 is an exploded view of the timer tea maker according to the first embodiment of the present invention.

Referring to FIG. 2 and FIG. 1 again, the timer unit 5 is mounted in a cover 131 at the top 13 of the infusion cup 1, comprising an actuating member 51, a timer 52, a cam wheel 53, and a block 54. The cam wheel 53 is fastened to the time-setting shaft 521 of the timer 52 for synchronous rotation. The time-setting shaft 521 is mounted with a knob 571. The block 54 is fixedly mounted on the cam wheel 53 for rotating with the cam wheel 53 to drive the actuating member 51.

As illustrated in FIG. 2, the cam wheel 53 has a plurality of teeth 531 arranged around the periphery. The timer unit 5 further comprises a locking plate 55, and a button 56. The locking plate 55 has a plurality of locking teeth 551 meshed with the teeth 531 of the cam wheel 53, and a sloping groove 552 coupled to the button 56.

Figure 3:
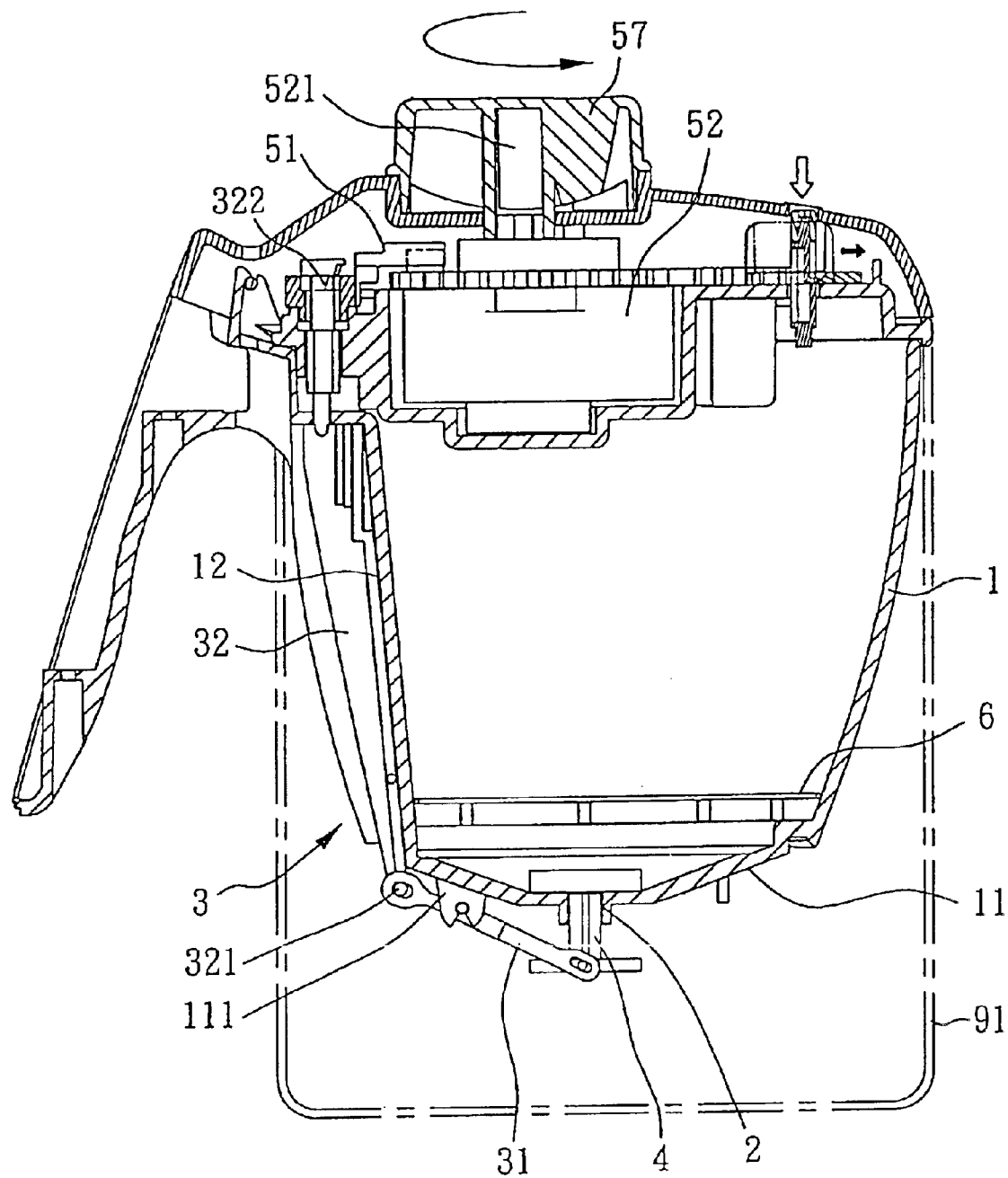
FIG. 3 is a side view in section of the timer tea maker according to the first embodiment of the present invention.

Referring to FIG. 3 and FIG. 2 again, the infusion cup 1 is put on a cup 91. Further, the infusion cup 1 has a through hole 2 in the bottom wall 11, a stopper 4 axially movably mounted in the through hole 2, and a foot member 111 downwardly extended from the bottom wall 11. A link mechanism 3 is mounted at a side face 12 of the infusion cup 1. The link mechanism 3 comprises a press bar 32 and a rocker arm 31. For easy installation of the link mechanism 3, the infusion cup 1 is made having a recessed portion 121 in the side face 12 adapted to accommodate the press bar 32 of the link mechanism 3. The rocker arm 31 is fastened pivotally with the foot member111, having one end pivotally coupled to the bottom end 321 of the press bar 32 and the other end pivotally coupled to the stopper 4. The top end 322 of the press bar 32 is pivotally coupled to the actuating member 51 of the timer unit 5.

Further, the infusion cup 1 is a transparent cup having a measurement scale 14 on the outer surface. Through the scale 14, the user can visually measure the amount of water put into the infusion cup 1 subject to the amount of tea-leaves (quantity of teaspoonfuls) to be applied.

Figure 4:
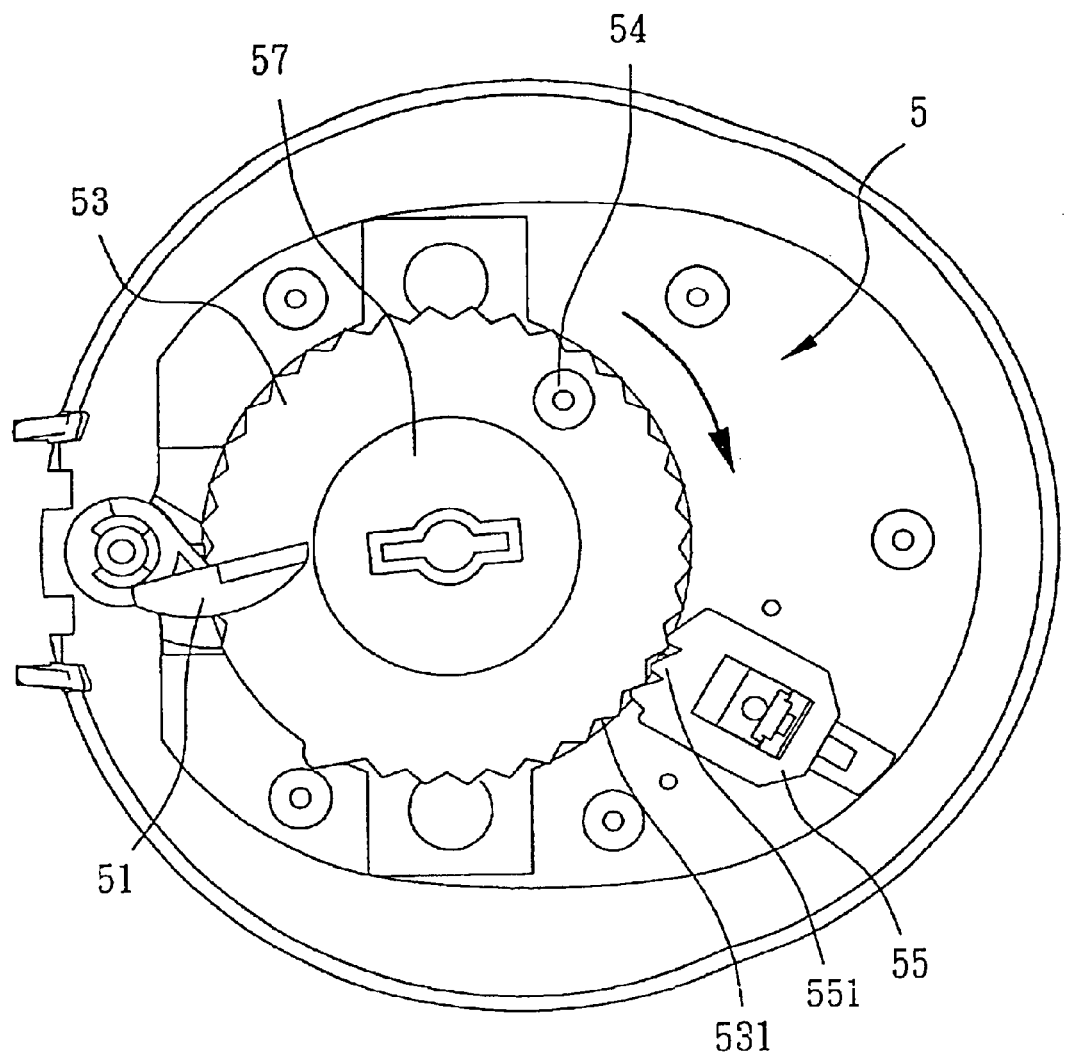
FIG. 4 is a schematic drawing showing the action of the timer tea maker according to the first embodiment of the present invention (I).

Referring to FIG. 4 and FIG. 3 again, when wishing to infuse tea-leaves, the knob 57 of the timer unit 5 (see the arrow sign in the drawings) is rotated by a user, subject to the desired setting time. At this time, the cam wheel 53 is simultaneously rotated with the knob 57 through an angle subject to the desired setting time for example, one minute or three minutes, and the block 54 is moved a certain distance away from the actuating member 51. At the same time, the locking teeth 551 of the locking plate 55 are meshed with the teeth 531 of the cam wheel 53 to stop the cam wheel 53 from rotation, and therefore the timer 52 is locked.

Figure 5:
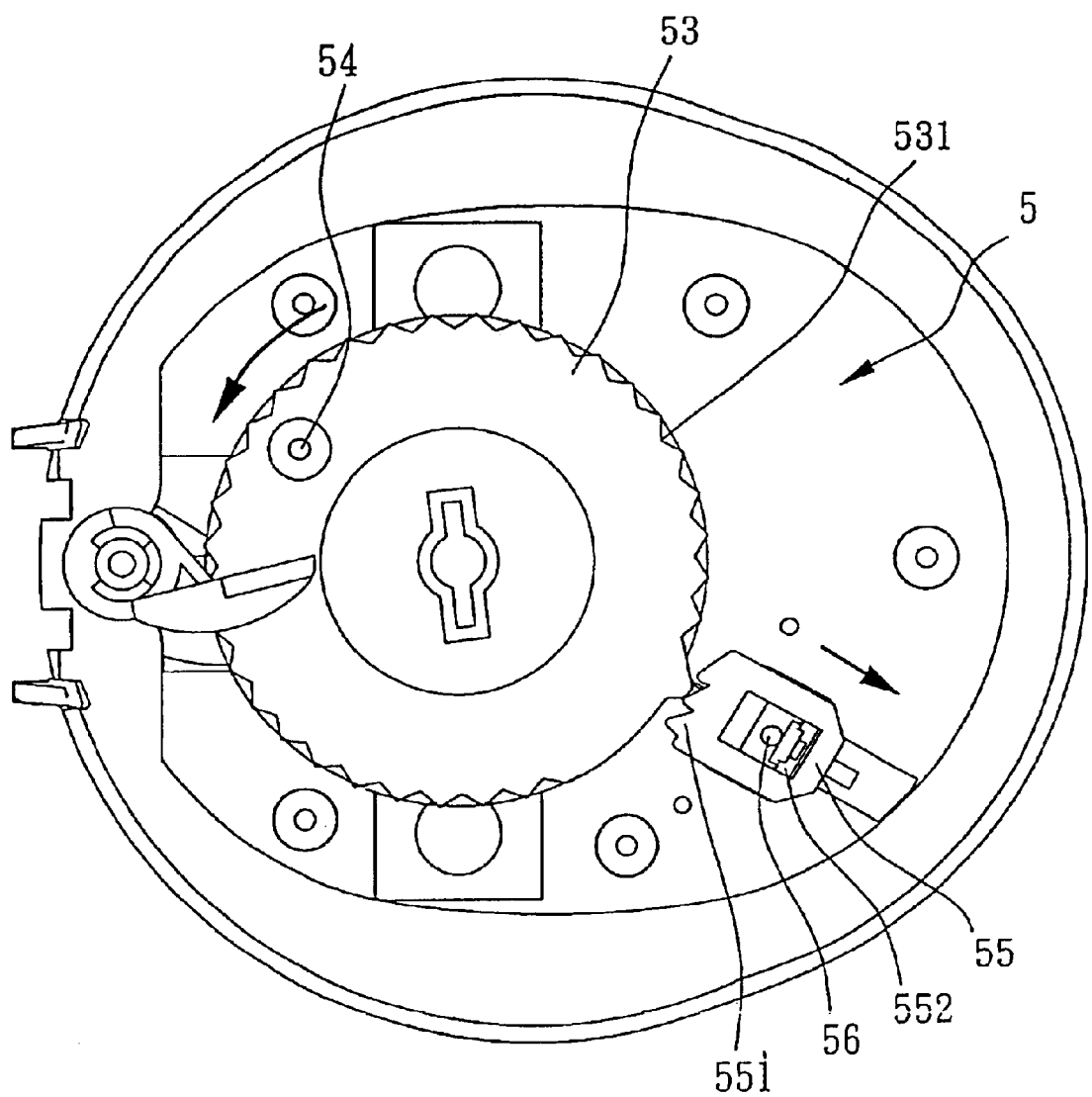
FIG. 5 is a schematic drawing showing the action of the timer tea maker according to the first embodiment of the present invention (II).

Referring to FIG. 5 and FIGS. 2 and 3 again, when initiating the infusion period, the user presses the button 56 of the timer unit 5. At this time, the button 56 is moved inwards along the sloping groove 552 to force the locking plate 55 outwards (see the arrow sign in the drawings), therefore the locking teeth 551 of the locking plate 55 will leave the teeth 531 of the cam wheel 53 to enable the timer 52 to start counting, and therefore the cam wheel 53 is rotated with the timer 52 to move the block 54 in direction as indicated by the arrow sign.

Figure 6:
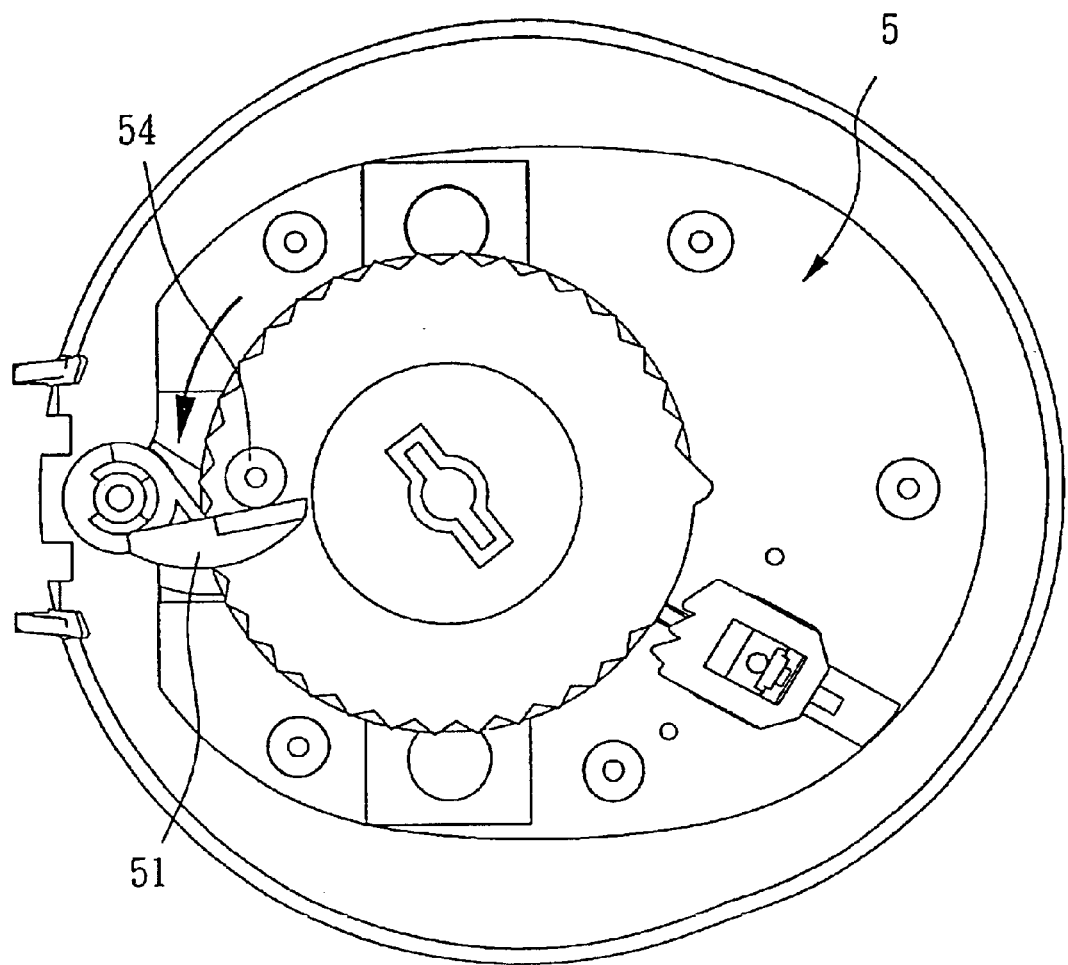
FIG. 6 is a schematic drawing showing the action of the timer tea maker according to the first embodiment of the present invention (III).
Figure 7:
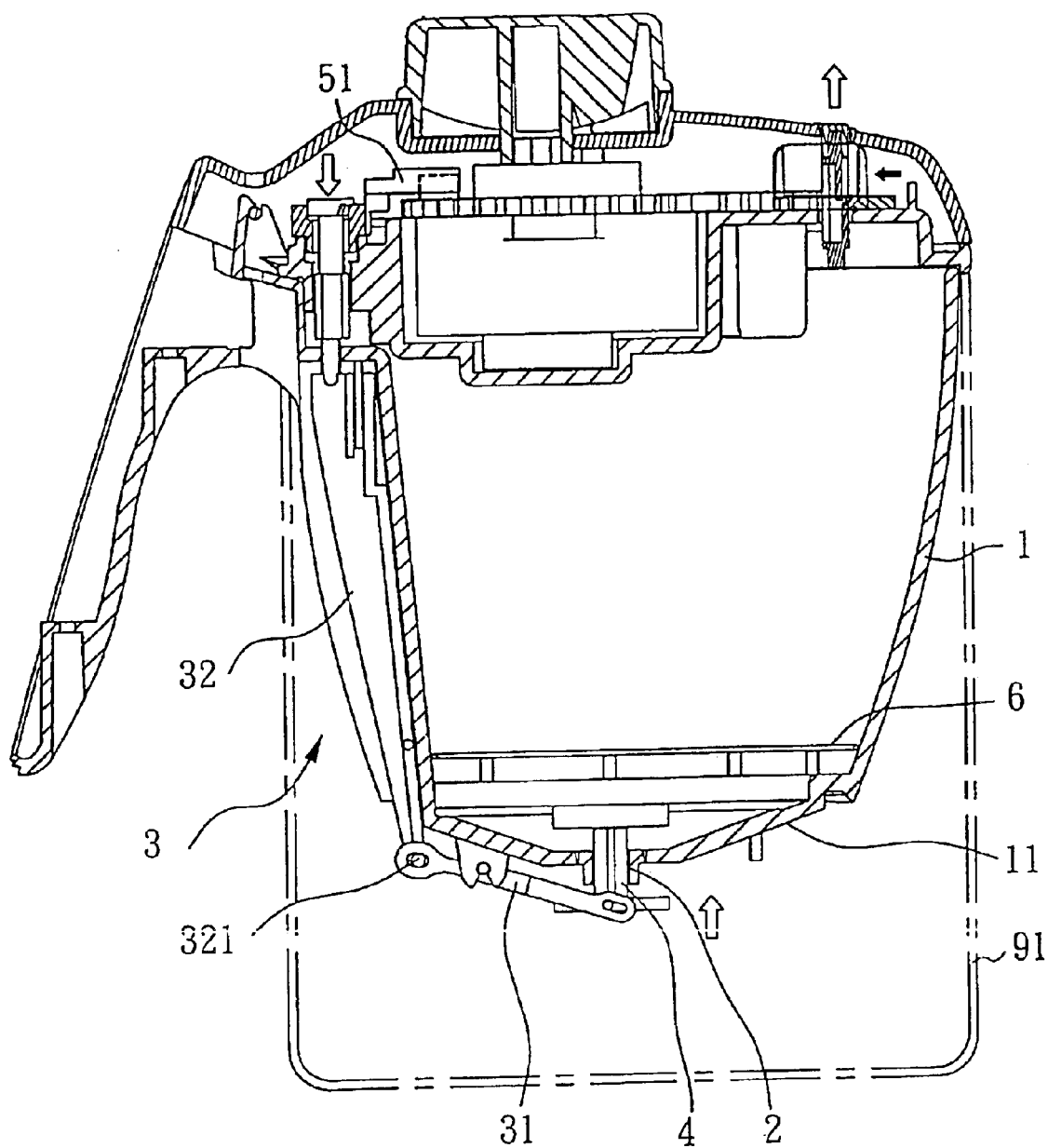
FIG. 7 is similar to FIG. 3 but showing the stopper lifted, the through hole of the cup opened.

Referring to FIGS. 6 and 7, and FIG. 2 again, when the pre-set time has expired, the block 54 touches the actuating member 51 and forces the actuating member 51 to rotate. Rotating the actuating member 51 causes the press bar 32 to be lowered into the recessed portion 121 of the infusion cup 1, and therefore the rocker arm 31 is forced by the press bar 32 to turn about the axis at the pivot point between the rocker arm 31 and the foot member 111 and to further push the stopper 4 upwards, for enabling prepared tea to flow out of the infusion cup 1 into the cup 91 through the through hole 2. Further, a wire gauze filter 6 is mounted in the infusion cup 1, and adapted to stop solid matter (tea-leaves) from passing through of the through hole 2.

Therefore, the user can set a predetermined infusion time When the pre-set time has expired, the timer unit 5 automatically opens the through hole 2 to discharge tea out of the infusion cup 1 into the cup 91 for service, thereby preventing an over-infusion.

Figure 8:
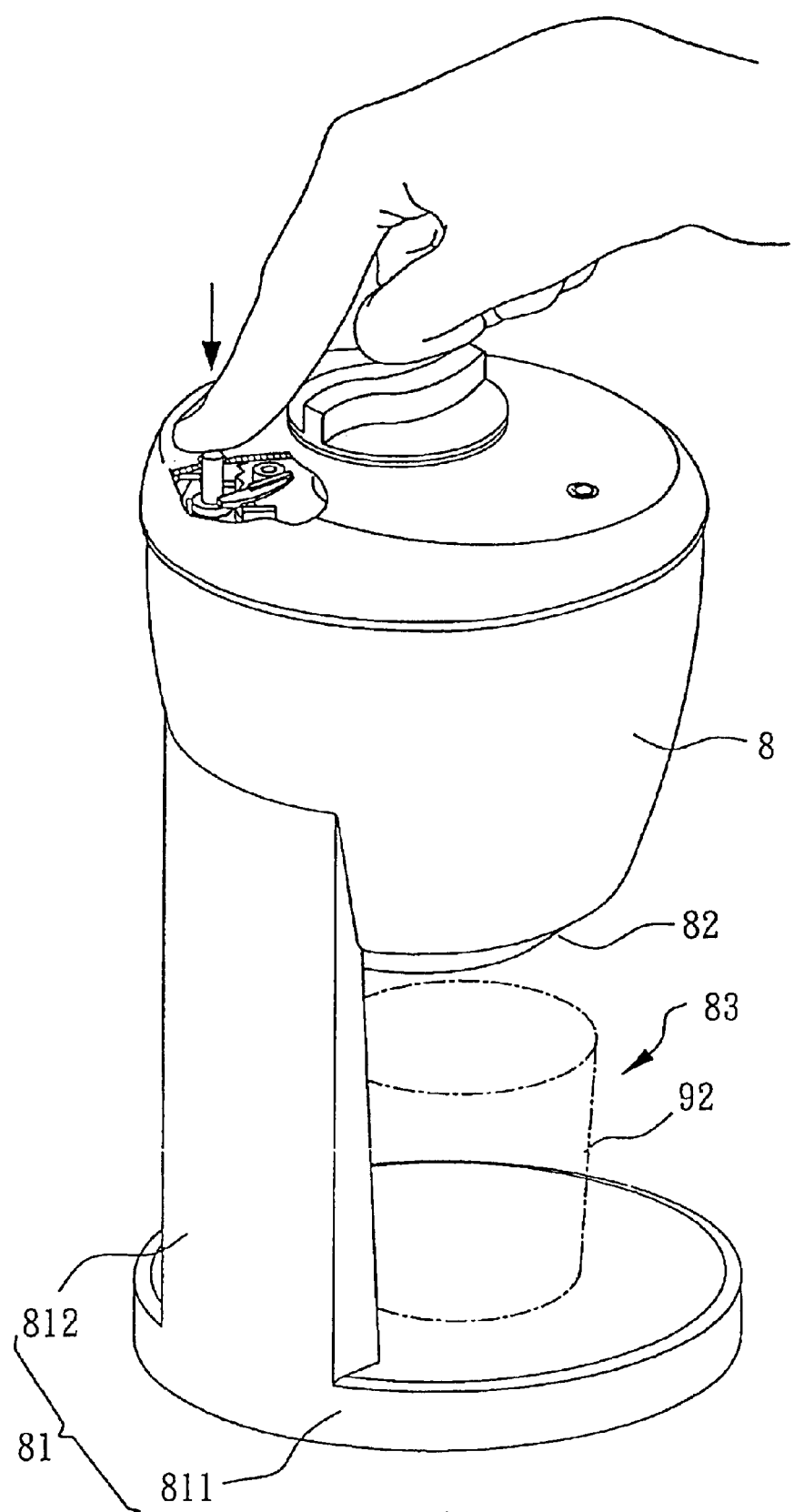
FIG. 8 is a perspective view of a timer tea maker according to the second embodiment of the present invention.

FIG. 8 is a perspective assembly view of a timer tea maker according to the second embodiment of the present invention. This embodiment is similar to the aforesaid first embodiment with the structure of the infusion cup. According to this embodiment, the infusion cup 8 is formed integral with a cup holder 81. The cup holder 81 comprises a base 811 and an upright support 812 perpendicularly upwardly extended from the periphery of the base 811 and terminating in the periphery of the infusion cup 8. The upright support 812 supports the infusion cup 8 above the base 811. Therefore, a space 83 is defined between the infusion cup 8 and the base 811 for receiving a cup 92.

The user may not use the timer unit 5 described in the aforesaid first embodiment, and can prepare tea manually. As shown in FIGS. 2 and 8, the user can directly press the link mechanism 3 to raise the stopper 4 from the through hole 2, enabling prepared tea to flow out of the through hole 2.

Further, the invention is not limited to the use of preparing tea. By means of using a different type of filter paper to substitute for the aforesaid wire gauze filter 6, the invention can also be used to make coffee. Further, the timer unit 5 described in the aforesaid first embodiment allows the user to set different infusion times, for example, 1 minute, 3 minutes, and 5 minutes. Therefore, the user can set the infusion time subject to the tea-leaves, coffee grounds etc used.

A prototype of timer tea maker has been constructed with the features of FIGS. 1~8. The timer tea maker functions smoothly to provide all of the features discussed earlier.

Although particular embodiments of the present invention have been described in detail for purposes of illustration, various modifications and enhancements may be made without departing from the scope of the invention. Accordingly, the invention is not to be limited except as by the appended claims.

What is claimed is:

1. A timer tea maker comprising:
   an infusion cup, said infusion cup comprising a through hole defined in a bottom wall of said infusion cup, a link mechanism mounted at one side face of said infusion cup, and a stopper axially movably mounted in said through hole and driven by said link mechanism to close/open said through hole, said link mechanism having a bottom side coupled to said stopper, and a top side extended to a top side of said infusion cup; and
   a timer unit mounted on said infusion cup for setting an infusion period and driving said link mechanism subject to the set time, said timer unit comprising an actuating member coupled to the top side of said link mechanism.

2. The timer tea maker as claimed in claim 1, wherein said timer unit is mounted on the top side of said infusion cup.

3. The timer tea maker as claimed in claim 2, wherein said infusion cup has a cover at the top side, and said timer unit is installed in said cover.

4. The timer tea maker as claimed in claim 1, wherein said infusion cup further comprises at least one foot member downwardly extended from the bottom wall.

5. The timer tea maker as claimed in claim 4, wherein said infusion cup further comprises a recessed portion in said side face; said link mechanism comprises a rocker arm and a press bar, wherein said rocker arm is fastened pivotally with one of said at least one foot member, and having a first end coupled to said stopper and a second end, said press bar received in said recessed portion, and having a top end coupled to said actuating member of said timer unit and a bottom end coupled to the second end of said rocker arm.

6. The timer tea maker as claimed in claim 1, further comprising a filter mounted in said infusion cup.

7. The timer tea maker as claimed in claim I, wherein said timer unit comprises a timer, a cam wheel, and a block, wherein said timer having a time-setting shaft, said cam wheel mounted on said time-setting shaft for synchronous rotation, and said block fixedly located on said cam wheel and adapted to drive said actuating member.

8. The timer tea maker as claimed in claim 7, wherein said cam wheel has a series of teeth arranged around a periphery of said cam wheel; said timer unit further comprises a locking plate and a button, said locking plate having at least one locking tooth and a sloping groove, said at least one locking tooth adapted to engage the teeth of said cam wheel and to further stop said cam wheel from rotation, said sloping groove coupled to said button.

9. The timer tea maker as claimed in claim 1, wherein said infusion cup is mounted on a cup.

10. The timer tea maker as claimed in claim 1, wherein said infusion cup is transparent.

11. The timer tea maker as claimed in claim 10, wherein said infusion cup has a measurement scale defined on one side face of said infusion cup.

12. The timer tea maker as claimed in claim 1, wherein said infusion cup further comprising a cup holder, said cup holder comprising a base and an upright support, said base adapted to place a cup for receiving prepared tea from said infusion cup, and said upright support upwardly extended from said base and connected to the periphery of said infusion cup to hold said infusion cup above said base at a distance.

* * * * *